United States Patent
Kusunoki et al.

(10) Patent No.: US 6,991,149 B2
(45) Date of Patent: Jan. 31, 2006

(54) SURFACE TREATMENT METHOD, SURFACE TREATMENT APPARATUS, MEMBER SUBJECTED TO SURFACE TREATMENT, AND INTERMEDIATE MEMBER TO BE SUBJECTED TO SURFACE TREATMENT

(75) Inventors: Hiroaki Kusunoki, Hiroshima (JP); Tsutomu Masuda, Hiroshima (JP); Koji Tomiya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/468,463

(22) PCT Filed: Jul. 26, 2002

(86) PCT No.: PCT/JP02/07596

§ 371 (c)(1),
(2), (4) Date: Aug. 20, 2003

(87) PCT Pub. No.: WO03/011513

PCT Pub. Date: Feb. 13, 2003

(65) Prior Publication Data

US 2004/0074948 A1    Apr. 22, 2004

(30) Foreign Application Priority Data

Aug. 1, 2001    (JP) ............................ 2001-233675

(51) Int. Cl.
B23K 31/02    (2006.01)
(52) U.S. Cl. .................... 228/112.1; 228/2.1
(58) Field of Classification Search ............. 228/112.1, 228/2.1, 110.1; 156/73.5; 72/75, 67, 69, 72/112
See application file for complete search history.

(56) References Cited

U.S. PATENT DOCUMENTS

| 5,460,317 A | * | 10/1995 | Thomas et al. ........... 228/112.1 |
| 6,173,880 B1 | | 1/2001 | Ding et al. |
| 6,299,050 B1 | * | 10/2001 | Okamura et al. ........ 228/110.1 |
| 6,634,199 B2 | * | 10/2003 | Nomura et al. ................ 72/75 |

FOREIGN PATENT DOCUMENTS

| EP | 928 659 A1 | | 7/1999 |
| EP | 968 788 | | 1/2000 |
| JP | 10-183316 | * | 7/1998 |
| WO | WO 97/48517 | | 12/1997 |
| WO | WO 99/34951 | | 7/1999 |
| WO | WO 01/47655 A1 | | 7/2001 |

OTHER PUBLICATIONS

Hashimoto et al., Translation to JP 10-183316, 1-6, 1998.*
Matsunami Yuji, Patent Abstracts of Japan, Method of Reinforcing Cylinder Head Made of Aluminum Alloy Casting, Publication No.: 5256187, Publication Date: May 10, 1993.
Matsunami Yuji, Patent Abstracts of Japan, Local Reinforcing Method for Cylinder Head Made of Aluminum, Publication No.: 6081710, Publication Date: Mar. 22, 1994.

(Continued)

Primary Examiner—Jonathan Johnson

(57) ABSTRACT

Two beams 17 and 18 perpendicular to a moving trajectory Q are formed in an intake port opening 14 of a cylinder head material to serve as margins for interfering with deformation of the opening 14 due to softening of the material, thereby a deformation of the material and a void caused by the deformation can be prevented in the frictional stirring with the rotary tool.

5 Claims, 24 Drawing Sheets

OTHER PUBLICATIONS

Kishimoto Yoshifumi, Patent Abstracts of Japan, Remelting Treatment of Aluminum-Made Cylinder Head, Publication No.: 7331399, Publication Date: Dec. 19, 1995.

Hashimoto Takenori, Patent Abstracts of Japan, Surface Modifying Method for Aluminum Casting Material, Publication No.: 10183316, Publication Date: Jul. 14, 1998.

Nomura Seiji, Patent Abstracts of Japan, Surface Treatment Method, and Member Treated Thereby, Publication No.: 2001181809, Publication Date: Jul. 3, 2001.

Nomura Seiji, Patent Abstracts of Japan, Method of Manufacturing Cylinder Head, Publication No.: 2001182609, Publication Date: Jul. 6, 2001.

* cited by examiner

FIG. 4

| SYMBOL | CHEMICAL COMPOSITION WT% | | | | | | | |
|---|---|---|---|---|---|---|---|---|
| | Cu | Si | Mg | Zn | Fe | Mn | Ti | Al |
| AC4D | 1.0~1.5 | 4.5~5.5 | 0.4~0.6 | ≦0.3 | ≦0.6 | ≦0.5 | ≦0.2 | BALANCE |

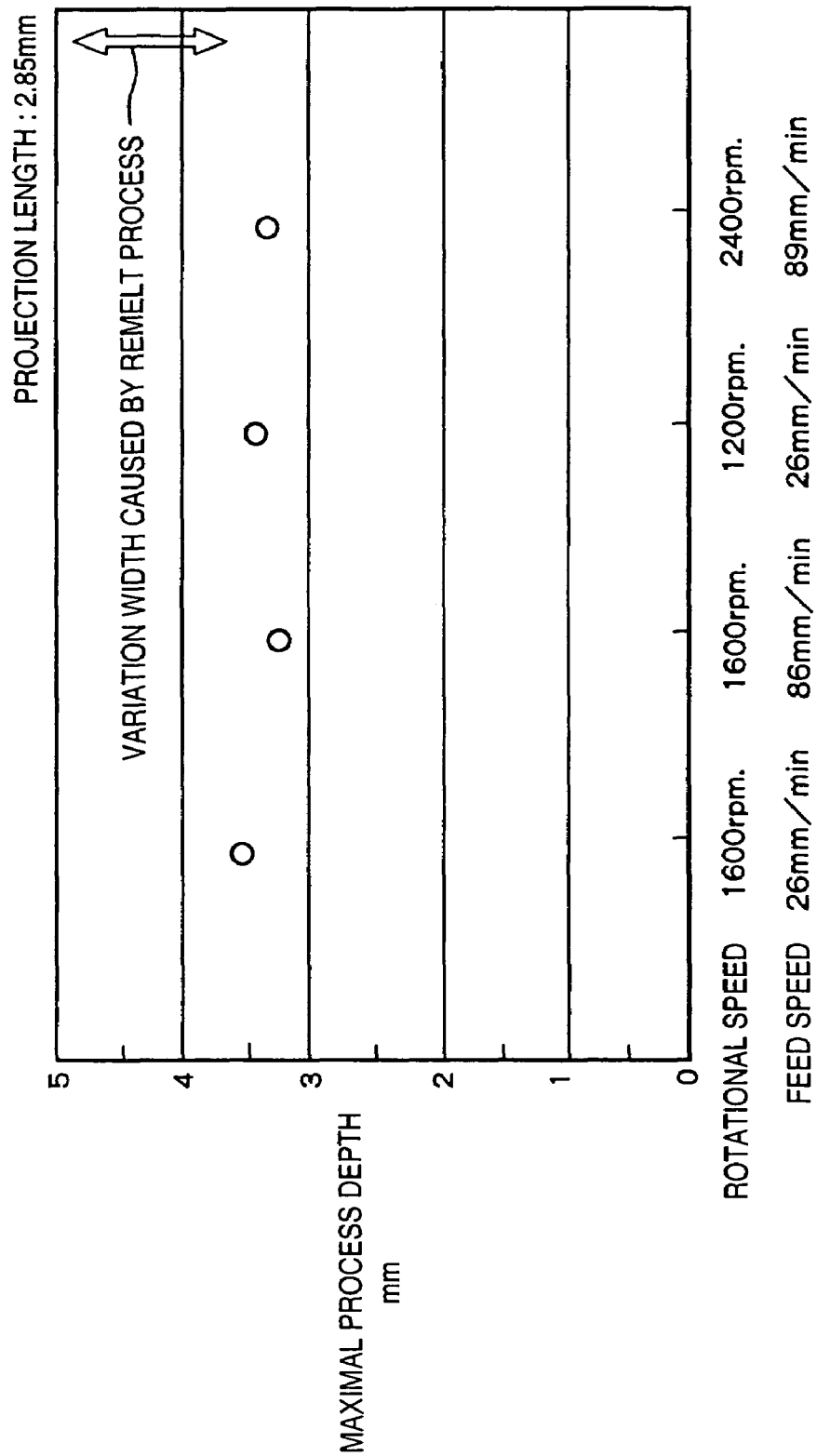

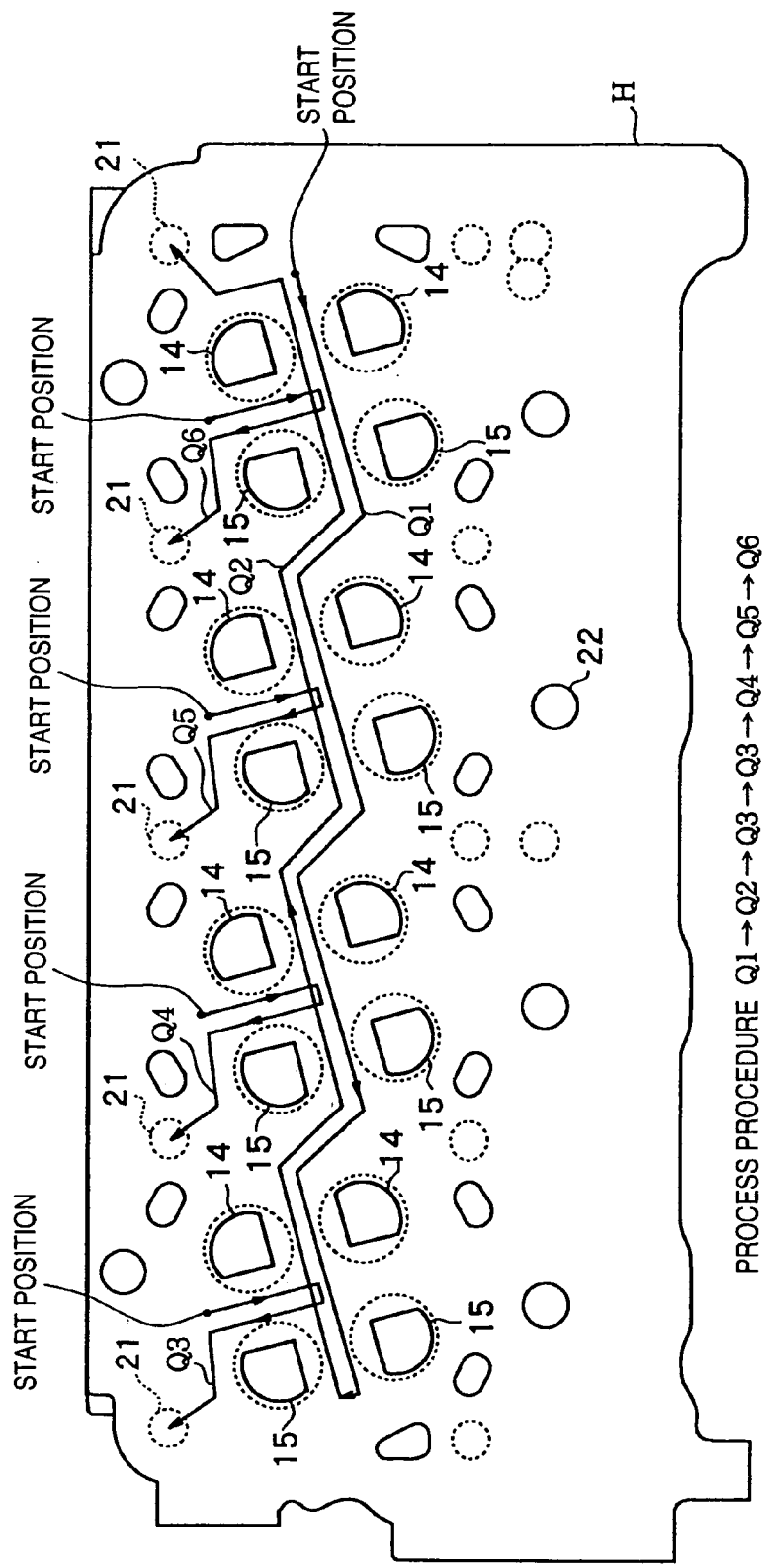

FIG. 18

| CUMULATIVE PROCESSED NUMBER | | 1ST | 11TH | 21ST | 31ST |
|---|---|---|---|---|---|
| FIRST PROCESS EXAMPLE | TOOL TEMPERATURE | 22°C | 46°C | 54°C | 48°C |
| | PROCESS DEPTH | 4.3mm | 4.2mm | 4.3mm | 4.25mm |
| SECOND PROCESS EXAMPLE | TOOL TEMPERATURE | 20°C | 87°C | 180°C | 174°C |
| | PROCESS DEPTH | 4.2mm | 4.35mm | 4.5mm | 4.55mm |

FIG. 20

| CUMULATIVE PROCESSED NUMBER | 1ST | 3RD | 5TH | 7TH | 10TH |
|---|---|---|---|---|---|
| TOOL POSITION MEASUREMENT DATA * | 0 | +0.03 | +0.055 | +0.09 | +0.11 |
| TOOL SURFACE TEMPERATURE | 27°C | 56°C | 71°C | 81°C | 98°C |

FIG. 21

| ROTATIONAL SPEED OF TOOL | 1000rpm |
|---|---|
| FEED SPEED DURING FORCING | 15.6mm / min |
| FEED SPEED DURING SURFACE MODIFICATION | 500mm / min |
| FEED SPEED DURING PULLING | 50mm / min |
| FORCING DEPTH OF TOOL | 6.64mm |
| FEED STOP TIME BEFORE START OF SURFACE MODIFICATION | 5sec |
| FEED STOP TIME AFTER END OF SURFACE MODIFICATION | 1sec |

FIG. 23

| WORK TEMPERATURE °C | ELECTRIC ENERGY CONSUMPTION KWs | |
| --- | --- | --- |
| | SURFACE OK | SURFACE NG |
| 60.3 | 111.88 | |
| 62.2 | | 113.18 |
| 64.7 | 110.67 | |
| 69.5 | 112.22 | |
| 72.3 | 110.33 | |
| 55.1 | 112.31 | |
| 71.1 | 110.72 | |
| 80.1 | 109.81 | |
| 81.1 | 109.28 | |
| 84.1 | 108.78 | |
| 85 | 109.33 | |
| 23.3 | 115.83 | |
| 24.1 | 115 | |
| 26.9 | 114.8 | |
| 36.9 | 113.69 | |
| 40.5 | 113.25 | |
| 44.1 | 112.53 | |
| 49.3 | 113.03 | |
| 50.9 | 112.75 | |
| 54.6 | 111.97 | |
| 56 | 112.13 | |
| 57.9 | 111.94 | |
| 58.3 | 111.93 | |

SURFACE TREATMENT METHOD, SURFACE TREATMENT APPARATUS, MEMBER SUBJECTED TO SURFACE TREATMENT, AND INTERMEDIATE MEMBER TO BE SUBJECTED TO SURFACE TREATMENT

TECHNICAL FIELD

The present invention relates to a surface treatment method and apparatus for, e.g., an aluminum alloy cast material, a member subjected to this surface treatment, and an intermediate member to be subjected to this surface treatment.

BACKGROUND ART

Japanese Patent Laid-Open No. 10-183316 discloses a surface treatment method, in surface treatment for a casting material such as a mating surface with respect to the cylinder block of a cylinder head, of forcing, while rotating, a rotary tool having a projection formed at its distal-end shoulder, thereby stirring in a nonmelted state with heat.

A portion between port openings (valve-to-valve portion) of a cylinder head repeats volume expansion due to combustion of the engine and volume shrinkage due to cooling, and cracking caused by thermal fatigue tends to occur there. Therefore, the valve-to-valve portion is surface-treated by frictional stirring to realize a metal with a finer structure and to decrease the area ratio of the cast tunnels, so a resistance against generation of cracking caused by thermal fatigue and propagation of cracking increases, thereby improving the thermal fatigue strength.

Due to the presence of the port openings, the rigidity of the material is low in the valve-to-valve portion. The pushing force and rotation moment of the rotary tool plastically deform the matrix structure of the side surfaces of the openings in the vertical and horizontal directions, and accordingly the shapes of the port openings change undesirably.

When the shapes of the port openings change, the material which has plastically fluidized by frictional stirring moves to the port opening side. Then, a void tends to occur in the surface modification region.

DISCLOSURE OF INVENTION

The present invention has been made in view of the above problems, and has as its object to provide a surface treatment method and apparatus which can prevent deformation of the material and a void caused by the deformation, a member subjected to this surface treatment, and an intermediate member to be subjected to this surface treatment.

In order to solve the above problems and to achieve the above object, according to a surface treatment method of the present invention, when a work having a plurality of openings is to be surface-treated in accordance with frictional stirring by inserting a rotary tool in a work surface between the openings, margins for interfering with deformation of the openings due to softening of a material are formed on the openings of the work, the work surface between the openings is stirred by the rotary tool, and post-machining for removing the work surface including the margins is performed. Thus, deformation of the material and a void caused by the deformation can be prevented.

Preferably, the rotary tool has a rod-like axial portion with a flat distal end, and a projection projecting from the distal end of the axial portion. Thus, the thermal fatigue strength can be improved while preventing deformation of the material and a void caused by the deformation.

Preferably, the work is a cast material, and a mold for forming the margins during casting of the work is arranged at an upper portion. Thus, the margins can be formed without increasing the number of manufacturing steps.

Preferably, the work is a cylinder head. Thus, the thermal fatigue strength can be improved while preventing deformation of the port openings of the cylinder head and a void caused by the deformation.

Preferably, when surface treatment is to be performed in accordance with frictional stirring by inserting a rotary tool detachably supported by tool support means of a machine tool in a work surface, a surface treatment region of the work is stirred by the rotary tool, the rotary tool is changed to a deflashing tool for removing a flash of the work, and the surface treatment region is processed with the deflashing tool. A frictional stirring process-and deflashing can be performed by using one machine tool. Thus, variations in process depth caused by thermal expansion of the rotary tool are suppressed, thereby preventing a void.

Preferably, the rotary tool has a plurality of rotary tools, and after a process with the deflashing tool, a rotary tool different from a rotary tool which is used immediately before is selected. Thus, a sufficiently long cooling period can be given to the rotary tool which is used immediately before.

Preferably, when a member subjected to surface treatment of frictional stirring by inserting a rotary tool in a work surface is to be inspected, a pre-treatment temperature of a surface treatment region is measured, a load of the rotary tool to the surface treatment region during a process are measured, and whether the surface treatment member is defective or not is checked from a preset correlation map of the pre-treatment temperature and the load of the rotary tool, and the measured pre-treatment temperature and load. Thus, the steps performed by visual observation can be eliminated, and whether the work is defective or not can be checked on-line during the process.

Preferably, the correlation map is defined by the pre-treatment temperature and an electric energy to be supplied to the rotary tool, and a rotational speed of the rotary tool can be changed by the electric energy. Thus, whether the work is defective or not can be checked from a change in electric energy supplied to the rotary tool.

According to a surface treatment method of the present invention, when a work having portions with different rigidities is to be surface-treated in accordance with frictional stirring by inserting a rotary tool in a work surface, a high-rigidity portion and a low-rigidity portion are separated in a surface treatment region of the work, the rotary tool is moved with respect to the work along the low-rigidity portion in a forward path, and subsequent to the forward path, the rotary tool is moved with respect to the work along the high-rigidity portion in a return path. Thus, deformation of a material caused by conduction of frictional heat and a void caused by the deformation can be prevented while processing a wide region by reciprocal motion.

Preferably, the surface treatment region has different thicknesses in the high- and low-rigidity portions. The rotary tool is moved with respect to the work along the high-rigidity portion with a thick surface treatment region in a return path. Thus, deformation of a material caused by conduction of frictional heat and a void caused by the deformation can be prevented while processing a wide region by reciprocal motion.

A member subjected to surface treatment of the present invention has a plurality of openings. Margins for interfering with deformation of the openings due to softening of a material are formed on the openings of the member which is subjected to surface treatment in accordance with frictional stirring by inserting a rotary tool in a member surface between the openings. A work surface between the openings is stirred by the rotary tool, and post-machining for removing the work surface including the margins is performed. Thus, the thermal fatigue strength can be improved while preventing deformation of the material during surface treatment and a void caused by the deformation. The present invention is preferably applied to a cylinder head made of an aluminum alloy cast material as the member.

An intermediate member according to the present invention has a plurality of openings. Margins which interfere with deformation of the openings due to softening of a material and are to be removed by post-machining are formed on the openings of the member which is subjected to surface treatment in accordance with frictional stirring by inserting a rotary tool in a member surface between the openings. Thus, the thermal fatigue strength of the product can be improved while preventing deformation of the material during surface treatment and a void caused by the deformation.

In a member which is subjected to surface treatment according to the present invention, when a work having portions with different rigidities is to be surface-treated in accordance with frictional stirring by inserting a rotary tool in a work surface, a high-rigidity portion and a low-rigidity portion are separated in a surface treatment region of the work, the rotary tool is moved with respect to the work along the low-rigidity portion in a forward path, and subsequent to the forward path, the rotary tool is moved with respect to the work along the high-rigidity portion in a return path. Thus, deformation of a material caused by conduction of frictional heat and a void caused by the deformation can be prevented while processing a wide region by reciprocal motion.

Preferably, the member is a member having a plurality of openings with a portion between the openings being continuously modified. The present invention is preferably applied to a cylinder head made of an aluminum alloy cast material as the member.

With a surface treatment apparatus according to the present invention, when a work having portions with different rigidities is to be surface-treated in accordance with frictional stirring by inserting a rotary tool in a work surface, a high-rigidity portion and a low-rigidity portion are separated in a surface treatment region of the work, the rotary tool is moved with respect to the work along the low-rigidity portion in a forward path, and subsequent to the forward path, the rotary tool is moved with respect to the work along the high-rigidity portion in a return path. Thus, deformation of a material caused by conduction of frictional heat and a void caused by the deformation can be prevented while processing a wide-region by reciprocal motion.

Preferably, when surface treatment is to be performed in accordance with frictional stirring by inserting a rotary tool detachably supported by tool support means of a machine tool in a work surface, a surface treatment region of the work is stirred by the rotary tool, the rotary tool is changed to a deflashing tool for removing a flash of the work, and the surface treatment region is processed with the deflashing tool. A frictional stirring process and deflashing can be performed by using one machine tool. Thus, variations in process depth caused by thermal expansion of the rotary tool are suppressed, thereby preventing a void.

Preferably, when a member subjected to surface treatment of frictional stirring by inserting a rotary tool in a work surface is to be inspected, a pre-treatment temperature of a surface treatment region is measured, a load of the rotary tool to the surface treatment region during a process are measured, and whether the surface treatment member is defective or not is checked from a preset correlation map of the pre-treatment temperature and the load of the rotary tool, and the measured pre-treatment temperature and load. Thus, the steps performed by visual observation can be eliminated, and whether the work is defective or not can be checked on-line during the process.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to claims which follow the description for determining the scope of the invention.

BRIEF DESCRIPTION OF DRAWINGS

FIG. 4 is a table showing the ratio of the components of an aluminum alloy according to this embodiment;

FIG. 6 is a graph showing the process depth as a function of the rotational speed and feed speed of a pin-type tool;

FIG. 14 is a view for explaining surface treatment for the cylinder head of an in-line multi-cylinder diesel engine employing a frictional stirring process according to this embodiment;

FIG. 18 is a table for comparing the tool temperature and process depth of the first and second process examples over time;

FIG. 20 is a table showing the surface temperature of the tool and tool position measurement data according to thermal expansion, which are obtained when ten works are continuously processed by one rotary tool;

FIG. 21 is a table showing conditions for surface treatment by frictional stirring;

FIG. 23 is a table showing the result of defect inspection by visual observation after a frictional stirring process.

BEST MODE FOR CARRYING OUT THE INVENTION

The embodiments of the present invention will be described in detail with reference to the accompanying drawings.

The embodiments to be described hereinafter are examples as means for realizing the present invention. The present invention can be applied to those obtained by modifying or changing the following embodiments within a range not departing from the spirit of the invention.

Figure 1:
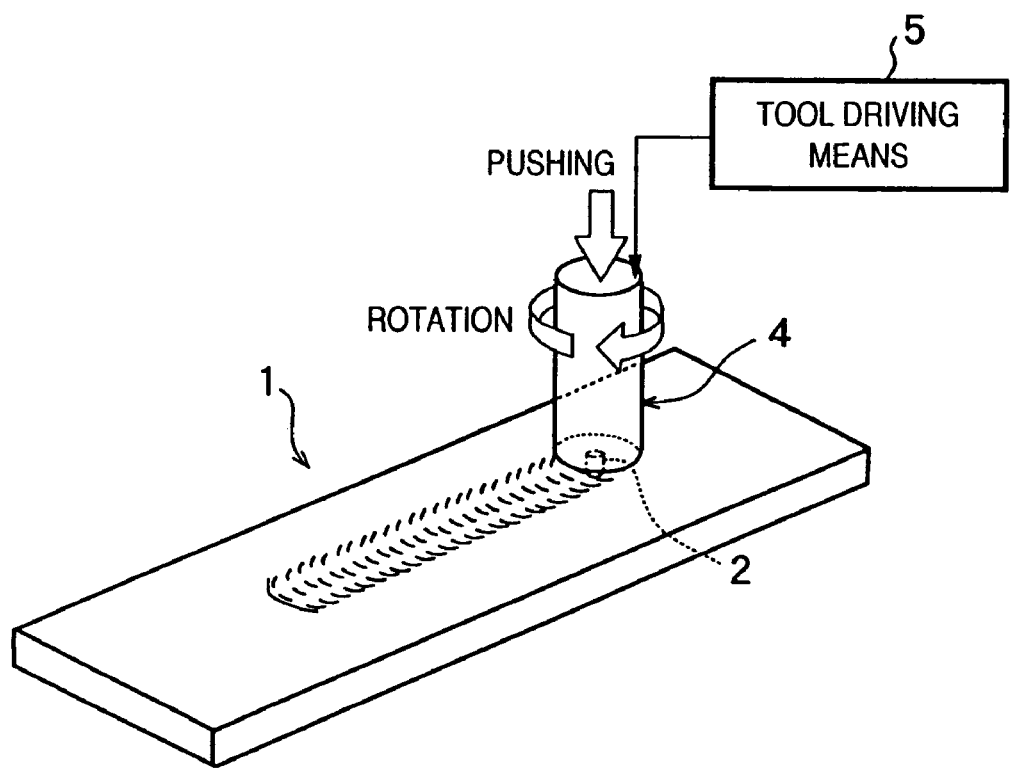
FIG. 1 is a schematic view of a frictional stirring apparatus for practicing a surface treatment method according to an embodiment of the present invention.
Figure 2:
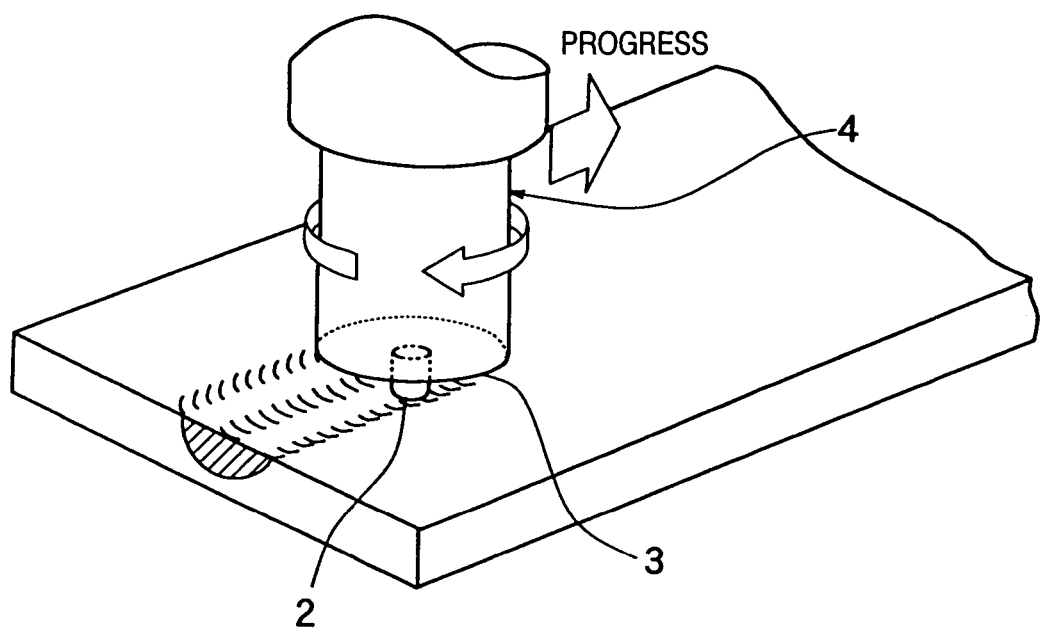
FIG. 2 is an enlarged view of a portion in the vicinity of the rotary tool of FIG. 1.
Figure 3:
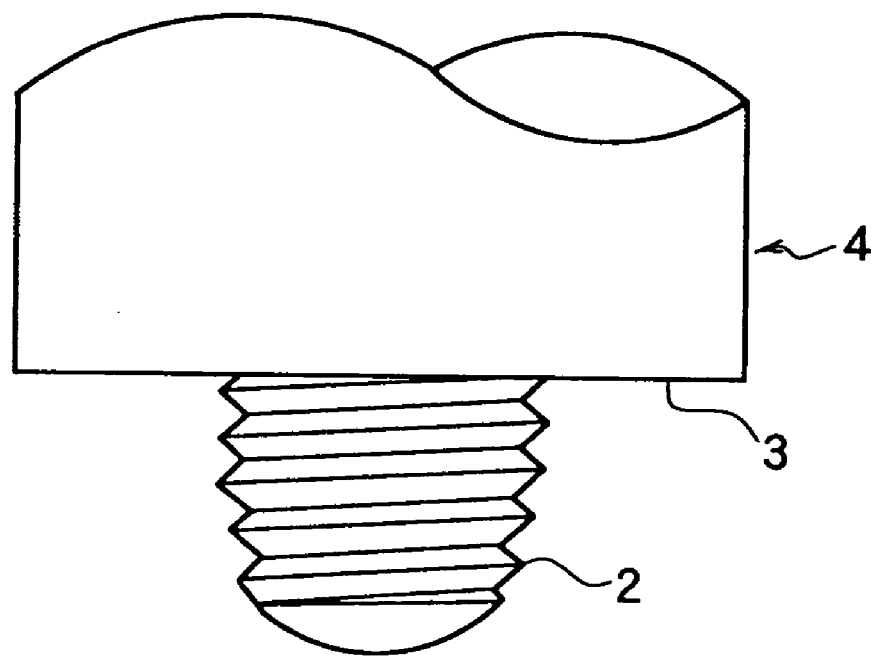
FIG. 3 is a detailed view of the distal end portion of the rotary tool.

FIG. 1 is a schematic view of a frictional stirring apparatus for practicing a surface treatment method according to an embodiment of the present invention. FIG. 2 is an enlarged view of a portion in the vicinity of the rotary tool of FIG. 1. FIG. 3 is a detailed view of the distal end portion of the rotary tool.

Surface treatment by means of frictional stirring according to this embodiment is aimed at an aluminum alloy cast material as an example of a target surface treatment member (to be referred to as work hereinafter), and is particularly used for a surface modification process for the purpose of improving the thermal fatigue strength of a portion between adjacent ports (valve-to-valve portion) formed in, e.g., the cylinder head of an automobile, or a piston, a brake disk, or the like of an automobile. When the surface modification region of the aluminum alloy cast material is stirred in an atmosphere without being melted by frictional heat, the metal structure becomes finer, the grains of eutectic silicon (Si) are dispersed uniformly, and cast defects are decreased. A modified surface which is better in the material characteristics, e.g., a thermal fatigue (low-cycle fatigue) life, elongation, and shock resistance, than that obtained with a conventional remelt process can be obtained.

A state of stirring without melting means that a metal is stirred after it is softened by frictional heat at a temperature lower than the lowest melting point for the respective components or eutectic compounds contained in the matrix.

As shown in FIGS. 1 to 3, a frictional stirring apparatus 1 has a rotary tool 4 with a non-wearable projection 2 integrally formed or mounted on a flat shoulder 3 of one end of a circular cylindrical shaft, a tool driving means 5 for rotating the rotary tool 4 so as to insert the projection 2 into a surface modification region of a work, while rotatably driving it, thereby relatively moving the projection 2 while pushing the work surface with the shoulder 3, and a jig (not shown) for aligning and holding the work. The non-wearable projection 2 has a diameter smaller than that of the shoulder 3, and has a screw thread on its outer surface.

As the tool driving means 5, one which can rotate the rotary tool 4 with a motor or the like, can move the rotary tool 4 in any of the vertical and horizontal directions with a feed screw mechanism, robot arm, or the like, and can variably control the rotational speed, feed speed, and pushing force (process depth) of the rotary tool 4 is used. According to another example of the tool driving means 5, the rotary tool 4 may be rotatably, axially supported by the main spindle of a machine tool such as a machining center (to be described later), and the work may be moved with respect to the rotary tool 4 two- or three-dimensionally relatively in the vertical or horizontal direction.

The projection 2 and the shoulder 3 of the rotary tool 4 are made of a steel stock, e.g., tool steel or stainless steel, with a higher hardness than that of an aluminum alloy. The projection 2 is formed to have a thread at a predetermined pitch.

According to this embodiment, as shown in FIG. 4, AC4D as an aluminum alloy standardized by JIS as a target surface treatment member is used as an example. The magnesium (Mg) content of the aluminum alloy can be changed within the range of 0.2 to 1.5 wt %. The silicon (Si) content of the aluminum alloy can be changed within the range of 1 to 24 wt %, preferably 4 to 13 wt %. In addition, AC4B, AC2B, AC8A used for pistons, or the like can also be utilized. The upper limit of the silicon content is set to 24% because if the silicon content is increased exceeding this limit, the material characteristics and casting properties are saturated, and stirring properties degrade.

When an aluminum alloy cast material containing magnesium is heat-treated, $Mg_2Si$ segregates and the material strength increases. When the aluminum alloy cast material containing magnesium is melted so the metal has a fine structure, as in the remelt process, sometimes low-melting (650° C.) magnesium is evaporated to decrease its content. When the magnesium content decreases, even when heat treatment is performed, the hardness and strength decrease, so desired material characteristics cannot be obtained.

With surface treatment by means of frictional stirring, the metal structure is not used, so magnesium is not evaporated. Thus, $Mg_2Si$ segregates from the aluminum alloy cast material by heat treatment, so the strength increases.

When silicon is added to the aluminum alloy, the casting properties (flowability, sink mark characteristics, and hot cracking resistance of molten metal) improve, but eutectic silicon serves as a kind of defect to decrease the mechanical characteristics (elongation).

Eutectic silicon is hard and brittle, and cracking starts in it or propagates through it, thus decreasing elongation. At a portion, e.g., a valve-to-valve portion, which is subjected to repeated thermal stress, the fatigue life decreases. In the metal structure, eutectic silicon runs along dendrite. When eutectic silicon is caused to have a fine structure and is dispersed uniformly, occurrence of cracking caused by stress concentration and propagation of occurred cracking can be suppressed.

Figure 5A:
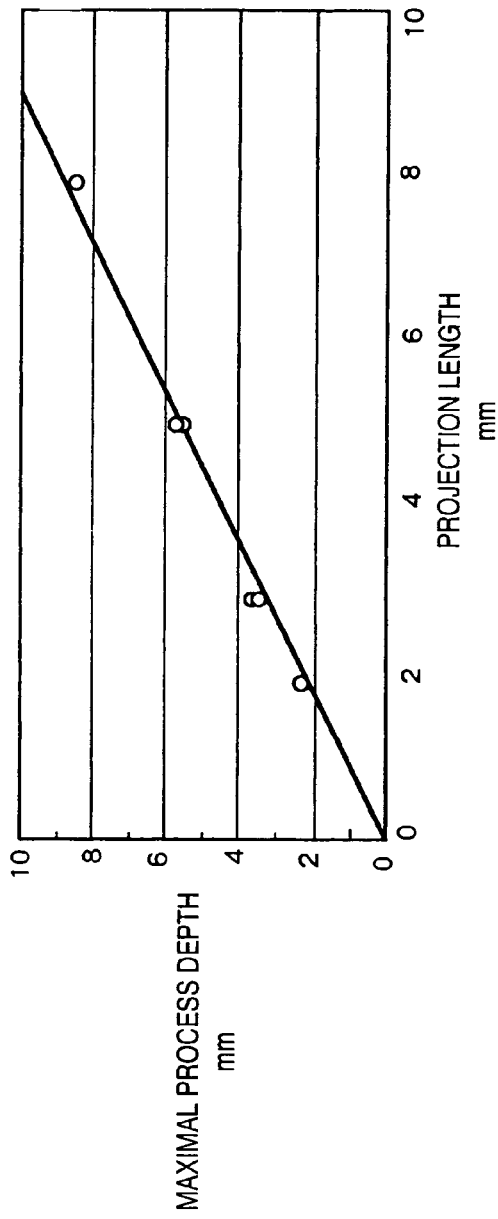
FIG. 5A is a graph showing the process depth as a function of the distal end pin length.
Figure 5B:
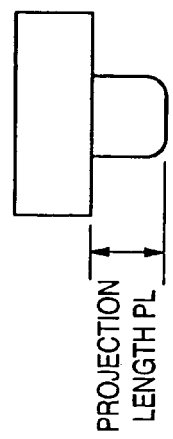
FIG. 5B is a view showing a distal end pin length PL.
Figure 5C:
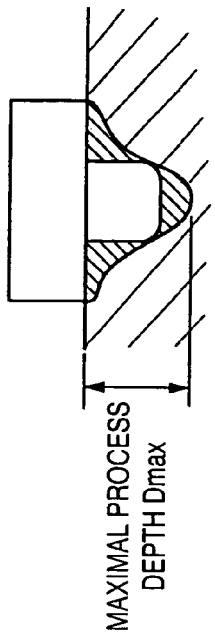
FIG. 5C is a view showing a maximal process depth Dmax.

FIG. 5A is a graph showing a process depth in accordance with a projection length, FIG. 5B is a view showing a projection length PL, and FIG. 5C is a view showing a maximal process depth Dmax. FIG. 6 is a graph showing the process depth as a function of the rotational speed and feed speed of the rotary tool.

According to this embodiment, the projection length PL is set to 80 to 90% a required depth. The required depth is 1.1 to 1.2 times the projection length, and can be set within about (0) to 10 mm. As shown in FIG. 5A, the maximal process depth Dmax increases in proportion (1.1 to 1.2 times the projection length) to the projection length PL, and the maximal process width also increases in proportion to the projection diameter. As shown in FIG. 5B, the maximal process depth Dmax is determined by the projection length PL, and is not largely adversely affected by the rotational speed or feed speed. Furthermore, variations in the maximal process depth Dmax are smaller than those of the maximal process depth obtained by the remelt process shown in FIG. 6, so the reliability can be increased.

Figure 7:
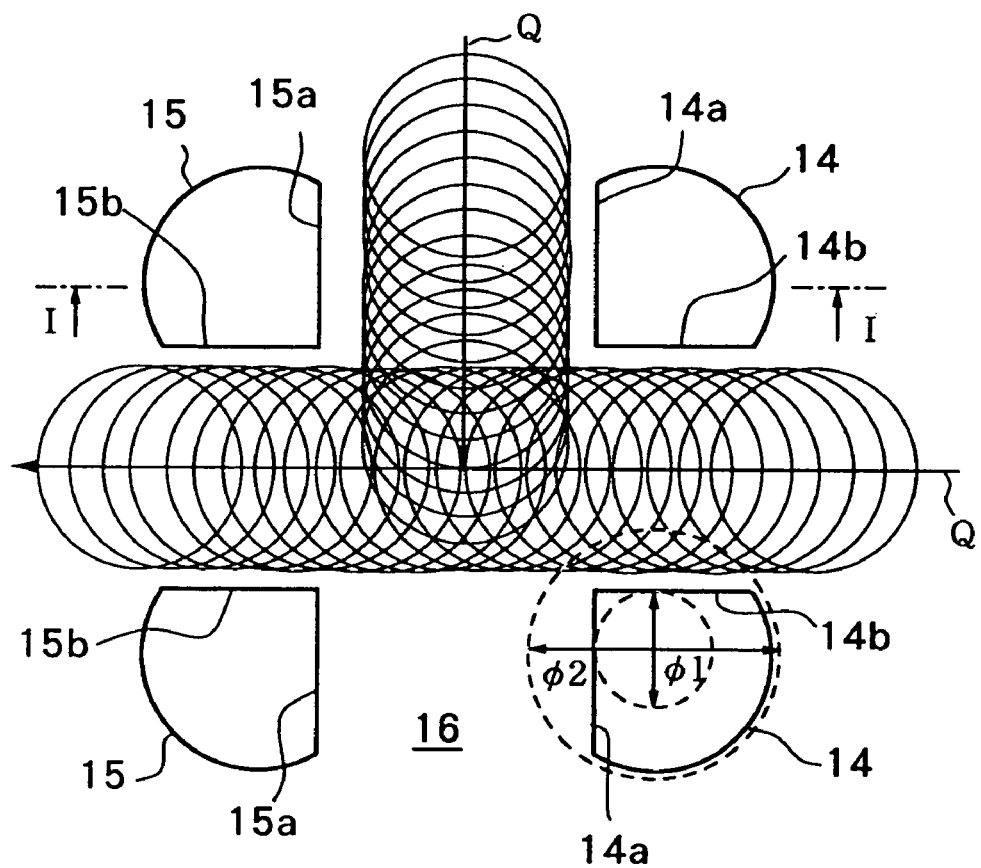
FIG. 7 is a view showing the basic shape of a portion near ports of a cylinder head material for a diesel engine before performing finishing for surface treatment by frictional stirring according to this embodiment.
Figure 8:
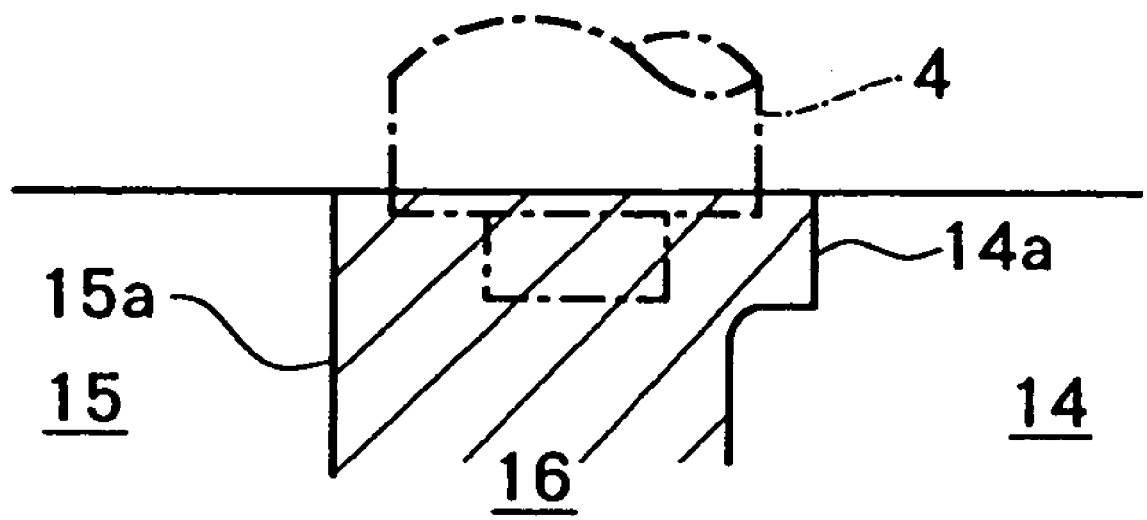
FIG. 8 is a sectional view taken along the line I—I of FIG. 7.
Figure 9:
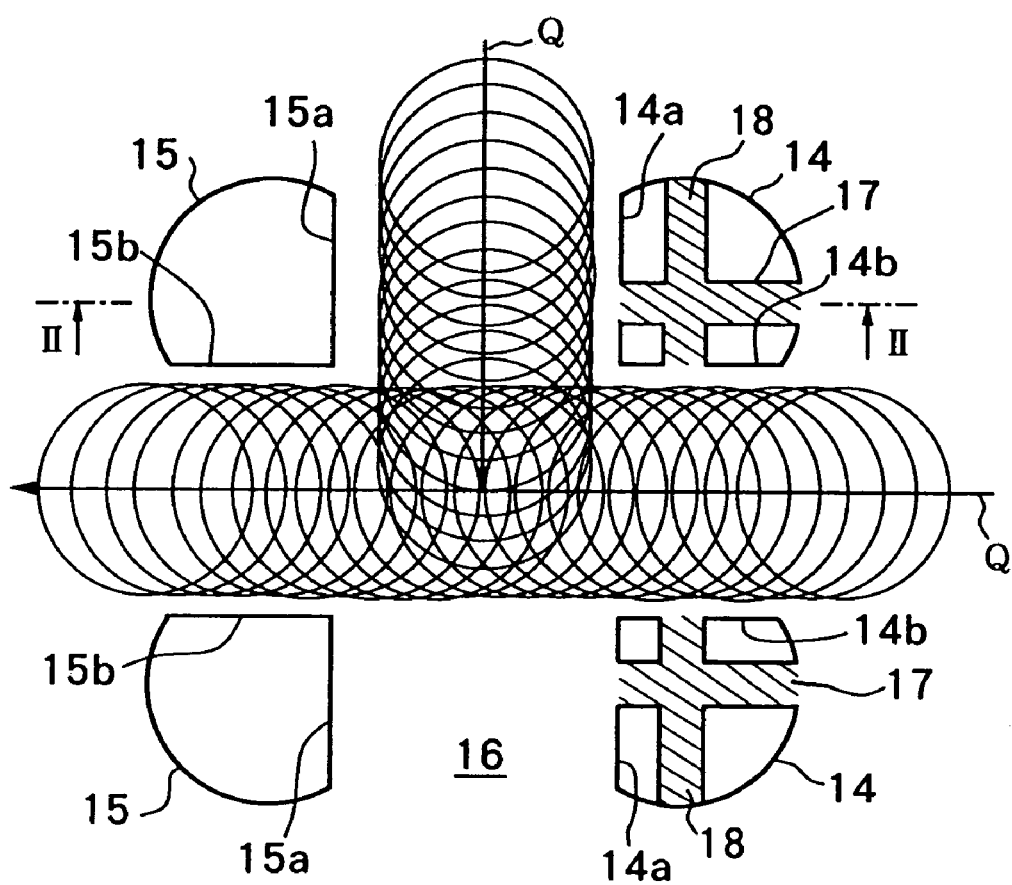
FIG. 9 is a view showing the characteristic shape of the portion near the ports of the cylinder head material for the diesel engine before performing finishing for surface treatment by frictional stirring according to this embodiment.
Figure 10:
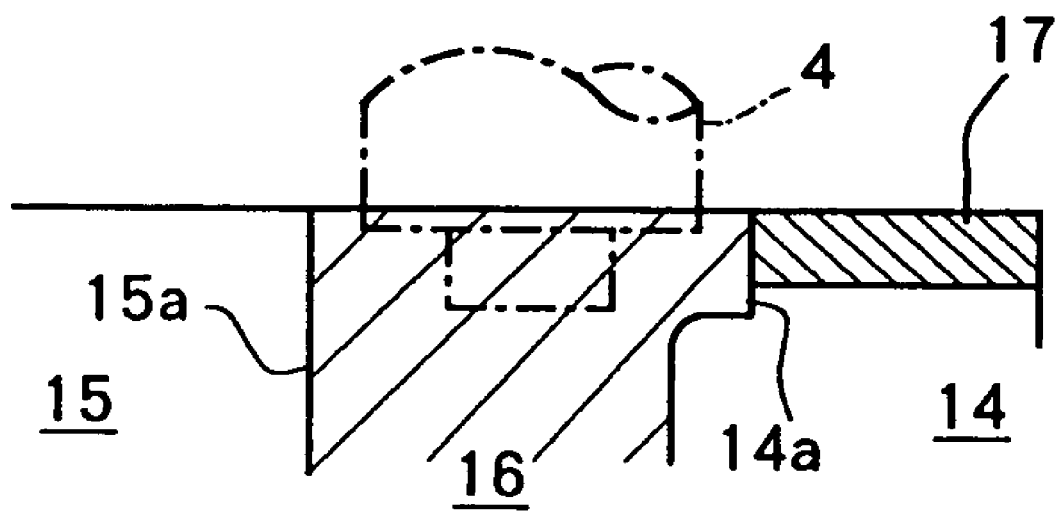
FIG. 10 is a sectional view taken along the line II—II of FIG. 9.

FIG. 7 is a view showing the basic shape of a portion near ports of a cylinder head material for a diesel engine before performing finishing for surface treatment by frictional stirring according to this embodiment. FIG. 8 is a sectional view taken along the line I—I of FIG. 7. FIG. 9 is a view showing the characteristic shape of the portion near the ports of the cylinder head material for the diesel engine before performing finishing for surface treatment by frictional stirring according to this embodiment. FIG. 10 is a sectional view taken along the line II—II of FIG. 9.

A valve-to-valve portion 16 with port openings on its two side surfaces repeats volume expansion due to combustion of the engine and volume shrinkage due to cooling, and cracking caused by thermal fatigue tends to occur there. Therefore, the valve-to-valve portion 16 is surface-treated by frictional stirring to realize a metal with a finer structure and to decrease the area ratio of the cast tunnels, so a resistance against generation of cracking caused by thermal fatigue and propagation of cracking increases, thereby improving the thermal fatigue strength.

Due to the presence of port openings 14 and 15, however, the work rigidity is low in the valve-to-valve portion 16. The pushing force and rotation moment of the rotary tool 4 plastically deform the matrix structure of the side surfaces of the openings 14 and 15 in the vertical and horizontal directions, and accordingly the shapes of the port openings 14 and 15 change undesirably.

When the shapes of the port openings 14 and 15 change, the material which has plastically fluidized by frictional stirring moves to the port opening side, and the material to be loaded on the exhaust port openings, 15 side of the projection 2 decreases. Thus, a tunnel-shaped void tends to occur in the surface modification region along a moving trajectory Q.

As shown in FIGS. 7 and 8, the surface modification region is set to extend from a portion between the intake port openings 14 and a portion between the exhaust port openings 15, and between the intake port opening 14 and exhaust port opening 15, as indicated by the outline of the shoulder 3 of the rotary tool 4 and the moving trajectory Q. Also, the shapes of those edges 14a, 14b, 15a, and 15b of the port openings 14 and 15 which are adjacent to the surface modification region are linearly formed along the moving trajectory of the rotary tool 4, so the shoulder 3 of the rotary tool 4 is in contact with the work surface throughout the entire range of the surface treatment process.

In this manner, the edges 14a, 14b, 15a, and 15b of the port openings 14 and 15 are linearly formed, so the apparent width of the valve-to-valve portion 16 is constant over the entire range of the surface modification region. As shown in FIG. 8, regarding the sectional shape (thickness) of the valve-to-valve portion 16, the thickness of the intake port opening 14 is smaller than that of the exhaust port opening 15 due to the limitations of that portion of the port shape which is not to be machined. Because of a difference in work rigidity accompanying this difference in sectional shape, plastic deformation of the matrix structure in the vertical direction caused by forcing of the rotary tool 4 and plastic deformation thereof in the horizontal direction caused by rotation moment tend to occur more easily in the intake port opening 14 than in the exhaust port opening 15.

Consequently, the material which has plastically fluidized by surface treatment in accordance with frictional stirring tends to fill easily on the intake port opening 14 side where the matrix is deformed, and the material to fill on the exhaust port opening 15 side of the projection 2 decreases, so a tunnel-like void tends to occur in the surface modification region along the moving trajectory Q.

This void usually occurs like a tunnel along the moving trajectory Q of the rotary tool 4, and its area (volume) becomes larger than that of the matrix porosity. As a result, cracking is caused by thermal fatigue and the resistance against propagation of cracking increases, and a desired thermal fatigue strength cannot be obtained.

In view of this, according to this embodiment, the ports as shown in FIGS. 7 and 8 are employed as those with a basic shape, and as shown in FIGS. 9 and 10, two beams 17 and 18 with a width of about 4 mm and a height of about 5 mm and perpendicular to the moving trajectory Q are formed in each intake port opening 14 to serve as margins that interfere with deformation of the port opening 14 caused by softening of the material.

The beams 17 and 18 are formed in the following manner. A transfer portion for forming the beams is formed in the work casting mold. This mold is arranged at an upper portion. During casting of the work, the beams 17 and 18 are formed simultaneously. Therefore, the beams 17 and 18 can-be formed without increasing the number of manufacturing steps.

Due to the presence of the beams 17 and 18, the deformation resistance of the side surface of each intake port opening 14 in the horizontal direction increases greatly. As the cantilevered beam structure changes to a center beam structure, the deformation resistance in the vertical direction also increases. Thus, deformation of the port opening and occurrence of a void accompanying this deformation can be suppressed.

The beams 17 and 18 are removed together with the linear shaped portions in finishing so they do not adversely affect the intake efficiency.

In the above embodiment, beams are provided only to the intake port openings 14 which have a comparatively low work rigidity, but may be provided to the exhaust port openings 15 in accordance with the port shapes. Regarding the width and height of the beams 17 and 18, the sizes of the beams 17 and 18 may be changed when necessary in consideration of the thicknesses of the port openings, or the beams 17 and 18 may not be perpendicular but may form a T-letter shape.

The port openings may be completely closed in work casting provided that they do not largely adversely decrease in productivity in finishing. Alternatively, a port opening $\phi 1$ shown in FIG. 7 may be decreased so as to satisfy $\phi 1 \leq \phi 2/2$ where $\phi 2$ is the port inner diameter after finishing. In this case, the port opening has a circular shape and has no linear portions, so its deformation can be decreased. Alternatively, the port opening may be elliptic in place of circular.

[Cylinder Head Manufacturing Method]

A manufacturing process for a diesel engine cylinder head according to this embodiment will be described.

Figure 11:
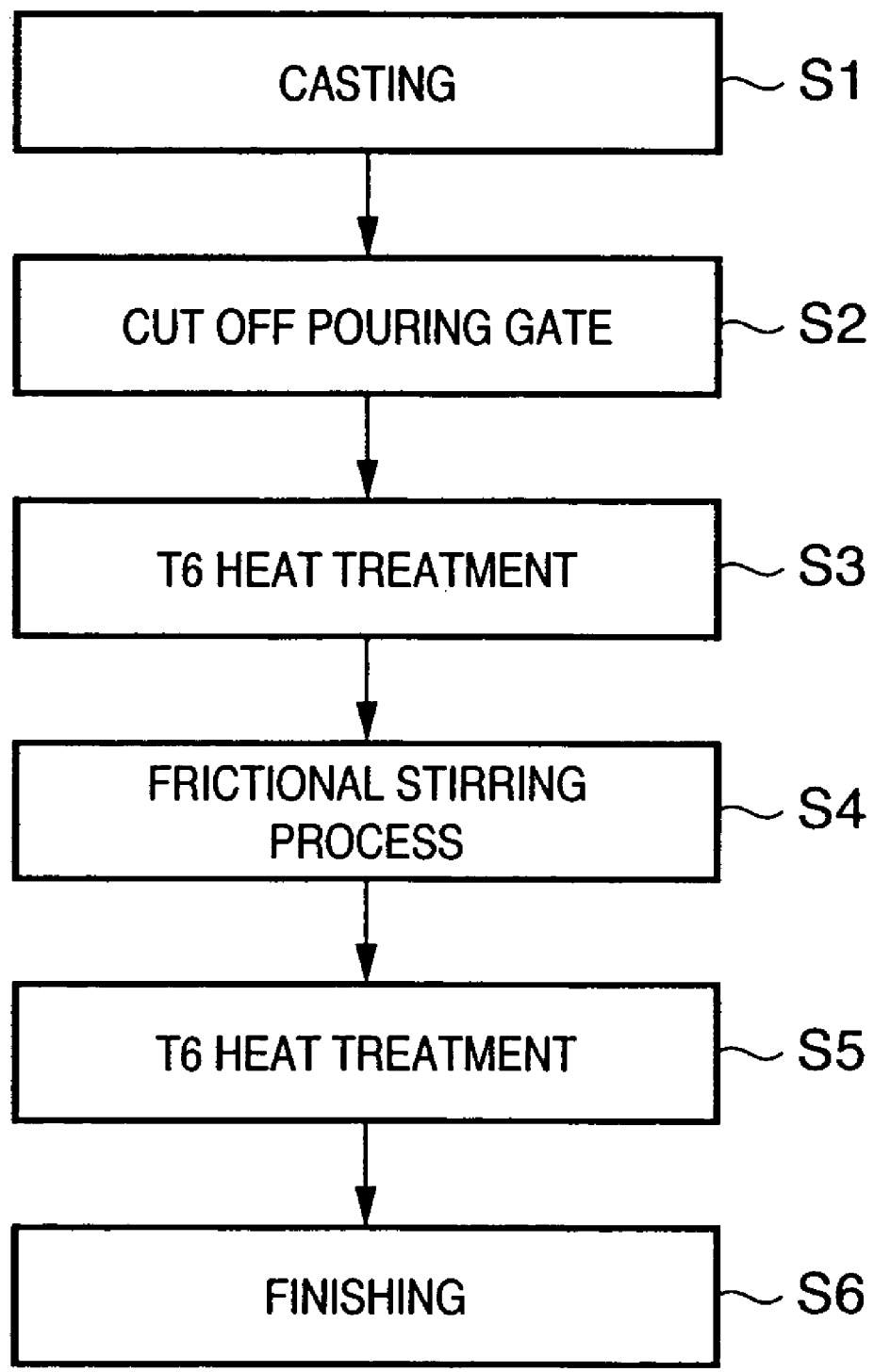
FIG. 11 is a flow chart for explaining a manufacturing process for the diesel engine cylinder head according to this embodiment.

FIG. 11 is a flow chart for explaining a manufacturing process for the diesel engine cylinder head according to this embodiment.

As shown in FIG. 11, in step S1, a cylinder head as an intermediate body is cast from an aluminum alloy. In step S2, the cast material is extracted from the casting mold, and its runner gate is removed. In step S3, the cast material extracted from the casting mold is subjected to T6 heat treatment mainly for removing of the core sand. In step S4, the valve-to-valve portion of the cast material is subjected to surface treatment by means of frictional stirring. In step S5, the cast material is subjected to T6 heat treatment again to increase its hardness and strength. In step S6, finishing is performed.

[Surface Treatment by Means of Frictional Stirring]

The frictional stirring process in step S4 of FIG. 11 will be described.

Surface treatment by means of frictional stirring leaves a terminal end hole in a treatment end portion, to which as a projection shape is transferred. If a portion which is to be subjected to boring in a post step is a terminal end hole position, a terminal end hole can be avoided from being left. The projection diameter must be equal to or smaller than the post-machining hole diameter. Depending on the specification of the machining shape of the work or the specification of surface treatment, treatment must be performed twice or more by reciprocally moving the rotary tool 4 such that its moving trajectories Q are offset from each other.

At this time, as described with reference to FIGS. 7 to 10, regarding the sectional shape (thickness) of the valve-to-valve portion 16, the thickness of the intake port opening 14 is smaller than that of the exhaust port opening 15 due to the limitations of that portion of the port shape which is not to be machined. Because of a difference in work rigidity accompanying this difference in sectional shape, plastic deformation of the matrix structure in the vertical direction caused by forcing of the rotary tool 4 and plastic deformation thereof in the horizontal direction caused by rotation moment tend to occur more easily in the intake port opening 14 than in the exhaust port opening 15.

Frictional heat generated by first forward path treatment is conducted to the second return path treatment region. As the temperature increases, Young's modulus decreases to cause deformation easily. Then, a machining margin in the post step increases. When a deformation amount becomes excessive, flow of the material is promoted in the direction of deformation. Hence, the material to fill on a side opposite to the direction of deformation decreases, and a tunnel-like void tends to occur in the surface modification region along the moving trajectory Q.

In view of this, according to this embodiment, a high-rigidity portion (exhaust port opening side) resulted from the shape of the valve-to-valve portion is set at the treatment region of the second return path, so the problem of a decrease in Young's modulus caused by temperature rise is decreased, thereby preventing a decrease in deformation amount and occurrence of a void.

Figure 13B:
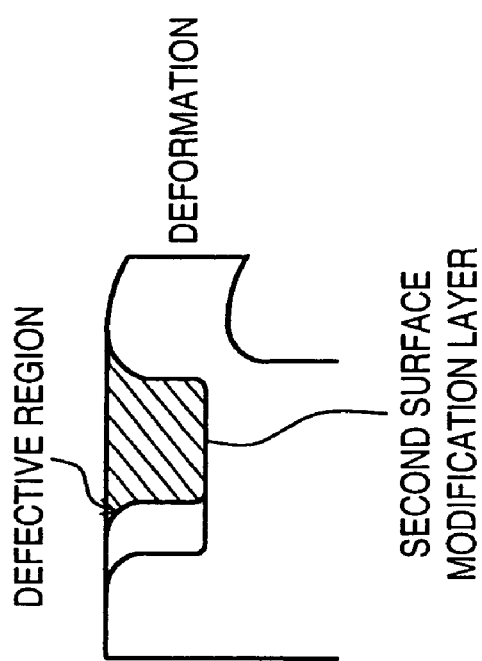
FIGS. 13A and 13B are sectional views of a valve-to-valve portion showing a comparative example against surface treatment of this embodiment.
Figure 13A:
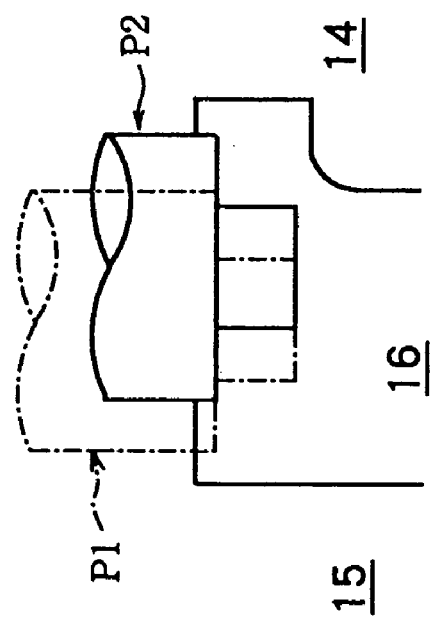

As shown in FIGS. 13A and 13B, when a process line P2 of the second return path is set at a portion with a low work rigidity (intake port opening 14 side), this portion with a low work rigidity deforms largely, while the exhaust port opening 15 of a portion with a high work rigidity maintains its original shape. This deformation causes fluidization of the material, so a void occurs in the surface modification region due to the flow of the material caused by this deformation.

Figure 12B:
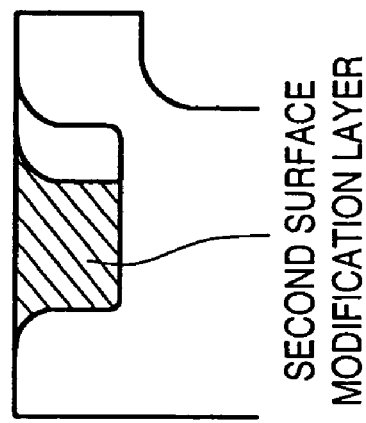
FIGS. 12A and 12B are sectional views of a valve-to-valve portion showing an example of surface treatment of this embodiment.
Figure 12A:
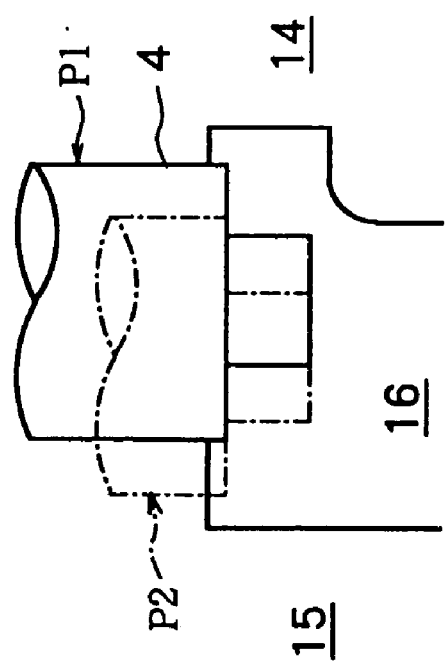

As shown in FIGS. 12A and 12B, when a process line P2 of the second return path is set on the exhaust port opening 15 side of a portion with a high work rigidity, both the portion with the high work rigidity and the portion with a low work rigidity almost maintain the original shapes, and occurrence of a void in the surface modification region can be suppressed.

The defect of surface treatment using the rotary tool 4 with the projection 2 of this embodiment is that the terminal end hole of the projection 2 is left at the end point of the process line. Furthermore, a defect easily occurs in the process start point as well. In order to solve this, the process line is set to pass through the start point. When the surface of a cast material,.e.g., a cylinder head, which is to be subjected to bolt boring in the post process is to be processed, the end point of the process line is set at a position which is to be subjected to boring by using a projection with a diameter smaller than the hole diameter of boring. Hence, no terminal end hole is left in the product.

FIG. 14 is a view for explaining surface treatment for the cylinder head of an in-line multi-cylinder diesel engine employing a frictional stirring process according to this embodiment.

As shown in FIG. 14, a cylinder head material H has a pair of intake port openings 14, a pair of exhaust port openings 15, and a plurality of tension bolt holes 21 for fastening to a cylinder block (not shown), to correspond to a plurality of cylinders. The intake port openings 14 are required to be as large as possible in order to obtain a large intake amount. Hence, the portion between adjacent intake ports becomes narrow and thin.

In view of this, in this embodiment, according to an example, a process line runs along a first forward path Q1, a first return path Q2, and second round paths Q3 to Q6, so the surface of the cylinder head material H is stirred and modified without melting with the heat of the rotary tool. A continuous process is performed along the first forward path Q1 from one end toward the other end in the longitudinal direction of the cylinder head material H so the tool passes between the pairs of exhaust port openings 15 and intake port openings 14 which oppose each other with respect to one cylinder. The first forward path Q1 terminates at the corresponding tension bolt hole 21. The first return path Q2 is bent at the other end of the cylinder head material H and is offset in the opposite direction to the first forward path Q1. A continuous process is performed along the first return path Q2 from the other end toward one end in the longitudinal direction of the cylinder head material H so the tool passes between the pairs of exhaust port openings 15 and intake port openings 14 in a parallel manner. The first return path Q2 terminates at the corresponding tension bolt hole 21. After the process of the first return path Q2, the process sequentially progresses along the second round paths Q3 to Q6, from a cylinder adjacent to the bent position to the first return path Q2 while reciprocating between one pair of exhaust port openings 15 and one pair of intake port openings 14 that oppose each other. The second round paths Q3 to Q6 terminate at the corresponding tension bolt holes 21.

In each of the second round paths Q3 to Q6, the process line offset to the intake port opening 14 side having a low work rigidity forms a forward path, and the line offset to the exhaust port opening 15 side having a portion with a high work rigidity forms a return path, so they form a continuous round path. Hence, the respective process regions of the forward path and return path overlap.

When the process line of the second return path is set on the exhaust port opening 15 side having a high work rigidity, as with the second round paths Q3 to Q6, then deformation occurs neither in the portion with the high work rigidity nor in the intake port opening with the low work rigidity, and occurrence of a void in the surface modification region can be suppressed.

In surface treatment of the above cylinder head, it is preferable to set the rotational speed of the rotary tool to 700 to 1,100 rpm, the feed speed to 400 to 550 mm/min, the projection length to 5 to 6 mm, the projection diameter to 7±1 mm, and the shoulder diameter to 15±1 mm, so the total of the process widths of the first and second paths becomes equal to or less than (the width of the valve-to-valve portion of the material) −2 mm. The projection diameter and shoulder diameter are set to satisfy 2≦shoulder/projection<4. The forcing amount of the shoulder into the material treatment surface is set to 0.3 mm or more.

[Machine Tool as Tool Driving Means]

When surface-treatment is to be performed continuously by using one rotary tool in accordance with frictional stirring, the higher the actual operating efficiency of the surface treatment facilities, the more likely heat generated by friction of the work and rotary tool tends to accumulate in the rotary tool. The thermal expansion amount of the tool itself or that of the main spindle to which the tool is to be attached increases, so the position of the projection with respect to the work surface changes.

Due to the influence of this change, although the NC control data stays the same, the forcing amount of the rotary tool into the work surface becomes larger in hot working than in cold working. This causes variations in depth of the surface modification region, and adversely affects occurrence of an internal void.

In the case of surface treatment in accordance with frictional stirring, as the rotary tool is moved with its shoulder being urged against the work surface, a flash is formed on the work surface to correspond to the outer edge of the shoulder. A deflashing process for removing the flash then also becomes necessary.

In view of this, according to this embodiment, a machine tool having a tool changer is used, or a tool changer is provided to a machine tool. At least two rotary tools with the same shape and at least one deflashing tool are held by the tool changer. After the process using the deflashing tool, a rotary tool different from a rotary tool which is used immediately before is selected. Hence, surface treatment in accordance with frictional stirring and a process of removing a flash generated by the surface treatment are performed alternately.

According to this method, the wait time per rotary tool can be extended from the deflashing time for a time corresponding to (surface treatment time)×(number of held rotary tools). During the wait time, the temperatures of the rotary tools can be decreased. Therefore, variations in depth of the surface modification region which accompany the thermal expansion of the tool itself or that of the main spindle can be suppressed.

Figure 15:
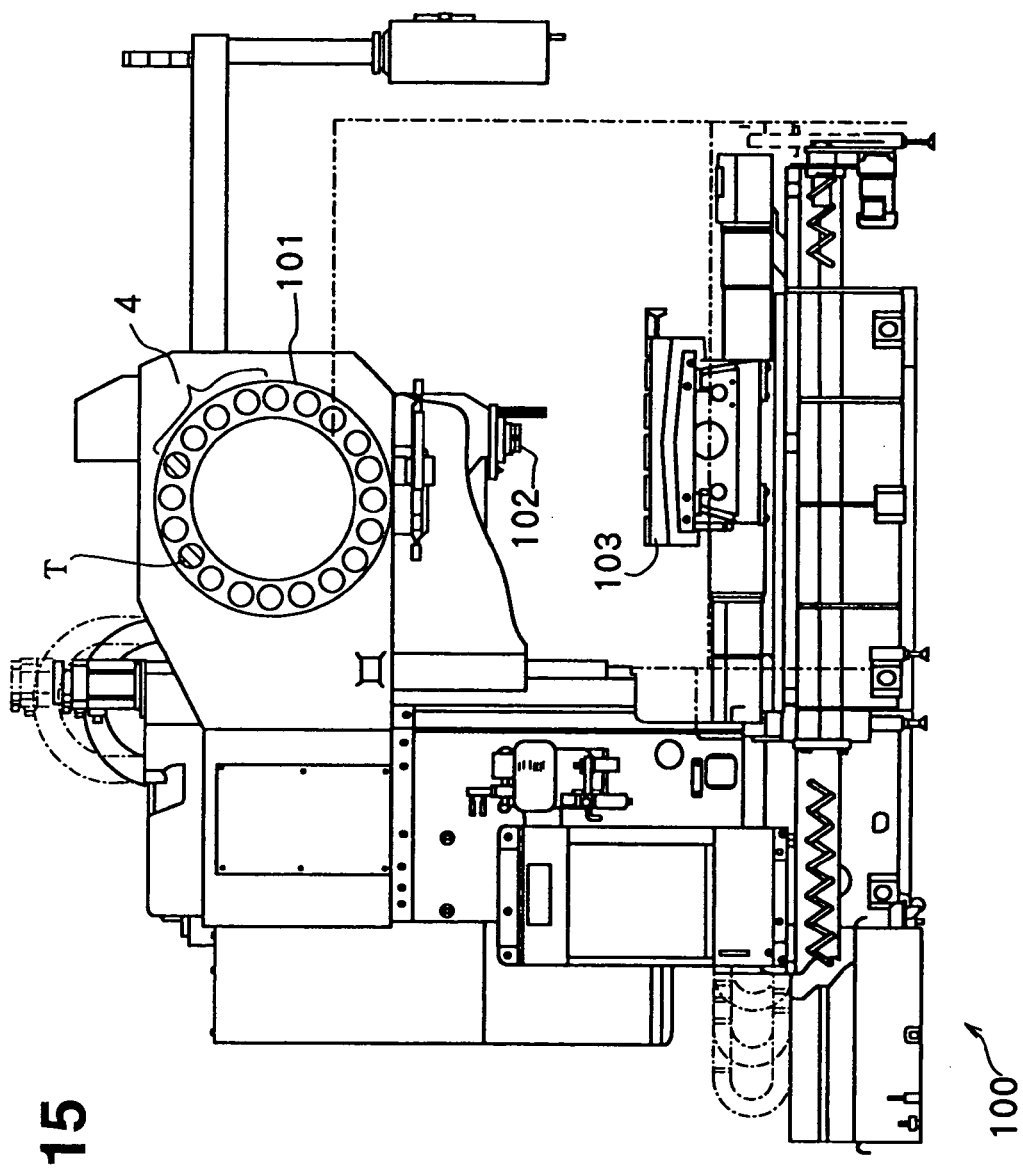
FIG. 15 is a schematic front view of a machine tool serving as-a tool driving means.

FIG. 15 is a schematic front view of a machine tool serving as a tool driving means.

As shown in FIG. 15, a machine tool 100 has a tool changer 101 for detachably supporting rotary tools 4 and a deflashing tool T, a main spindle 102 which selects the rotary tools 4 or deflashing tool T in accordance with the NC control program, rotates about the tool center shaft, and can move in the vertical direction, and an X-Y table 103 which holds the work to oppose the tool and moves the work relatively to the tool two-dimensionally. The machine tool 100 is numerically controlled in accordance with the NC control program stored in a controller (not shown). The work is aligned and held on the X-Y table 103 by a machining reference hole 22 (see FIG. 14).

Figure 16:
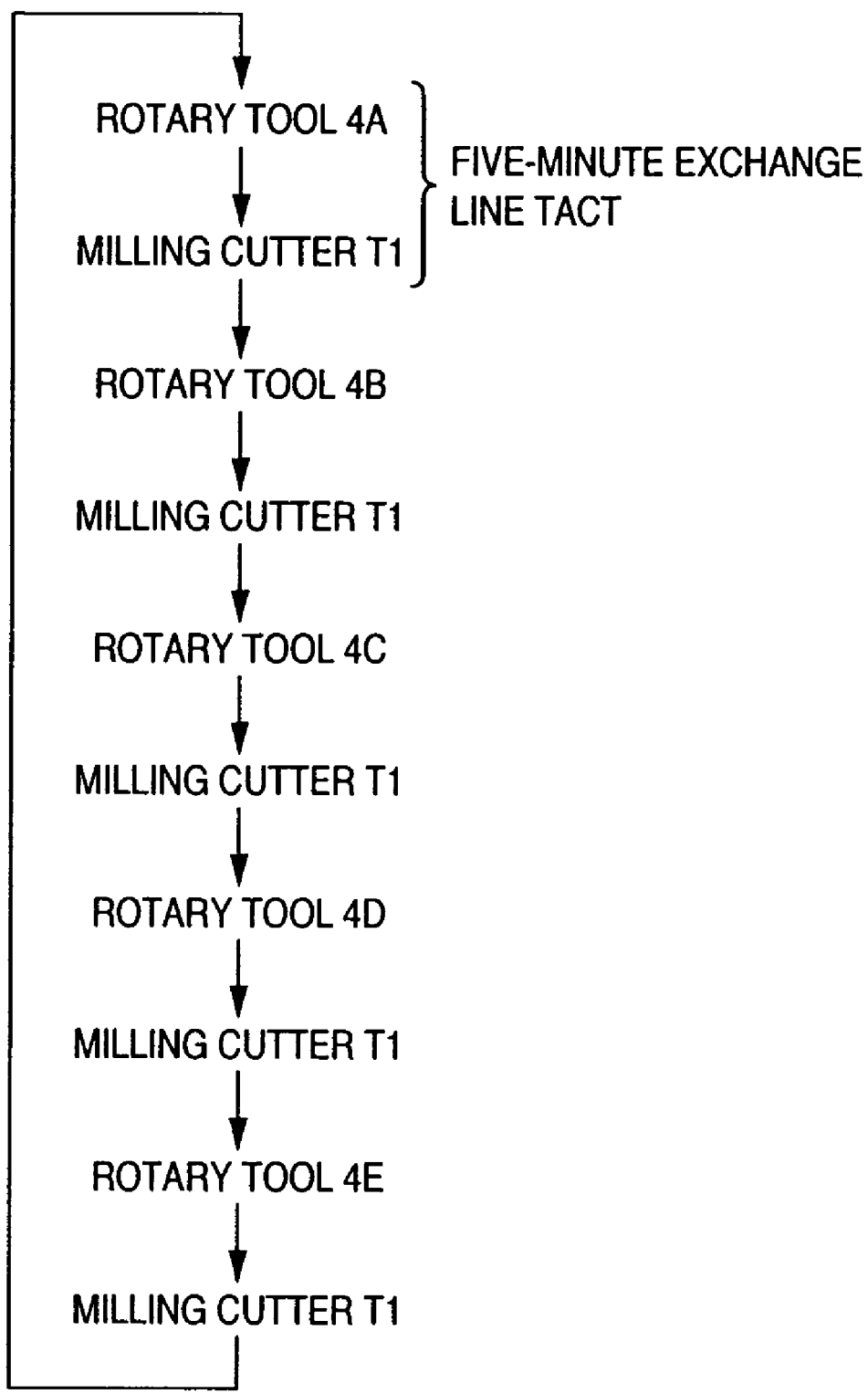
FIG. 16 is a view for explaining the first process example of surface treatment using a tool changer.

According to the first process example of this embodiment, five rotary tools 4A to 4E with the same shape and a milling cutter T1 serving as a deflashing tool are held by the tool changer 101. The process time per work is about 6 minutes, breaking down into 1 minute and 20 seconds for work exchange, 4 minutes for surface treatment, and 1 minute and 20 seconds for deflashing. After the first rotary tool 4A is used, the tools are sequentially exchanged in accordance with the procedure shown in FIG. 16, so that 31 works are continuously processed.

The number of tools to be attached to the tool changer 101 is preferably such that after a certain rotary tool is used, the time until this rotary tool is used next is at least 20 minutes so this rotary tool can be cooled sufficiently.

Immediately before the processes for the first, 11th, 21st, and 31st works by using the first rotary tool 4A were started, the surface temperature of the rotary tool was directly measured by a thermometer.

Figure 17:
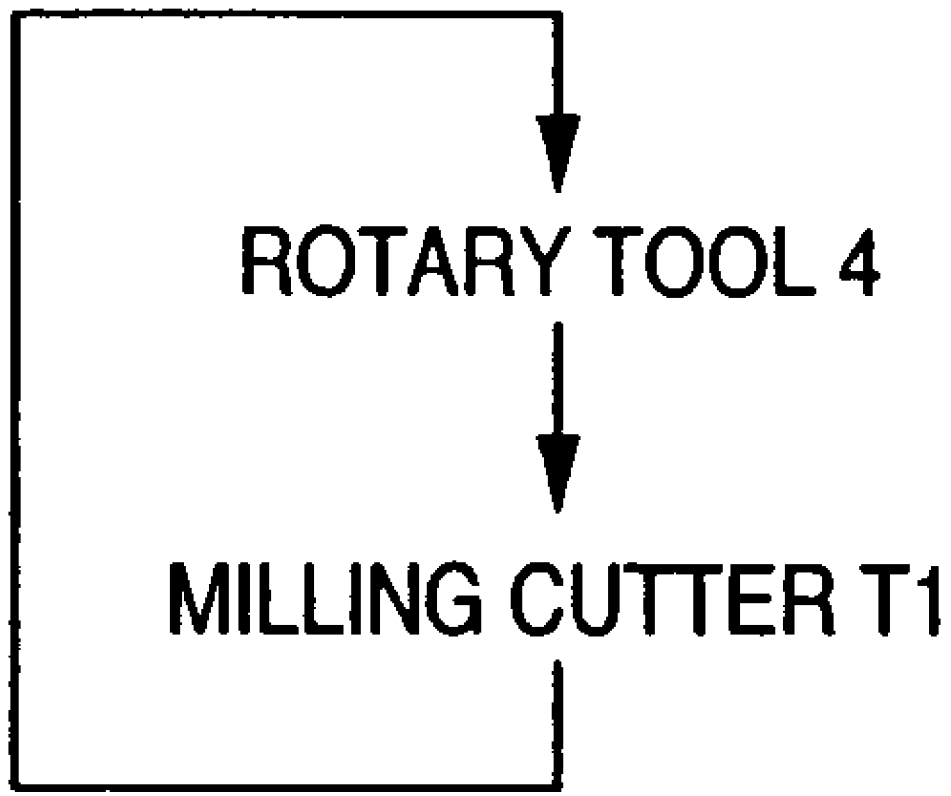
FIG. 17 is a view for explaining the second process example of surface treatment using a tool changer.

According to the second process example of this embodiment, each rotary tool 4 and the milling cutter T1 are held by the tool changer 101. The process time per work and its breakdown are set under the same conditions for the first process example. The tools are sequentially exchanged in accordance with the procedure shown in FIG. 17, so that 31 works are continuously processed.

Similarly, immediately before the processes for the first, 11th, 21st, and 31st works by using the first rotary tool 4A were started, the surface temperature of the rotary tool was directly measured by a thermometer.

FIG. 18 shows the temperatures and process depths measured for the first, 11th, 21st, and 31st works after the continuous process for the 31st work is ended according to the first and second process examples. According to the first process example, the process depths are substantially constant for any work. No internal void occurred, and the surface temperatures of the rotary tools did not change largely. Hence, good results were obtained.

According to the second process example, the surface temperatures of the rotary tools increased sharply from the first to 11th work, and from the 11th to 21st work. Accordingly, the process depths gradually increased, and an internal void occurred in the 21st and 31st works.

In the first process example, the process time per rotary tool is se to (process time per work)×(number of rotary tools) (about 30 minutes), and the substantial wait time for the rotary tool is ensured for about 6 minutes. In this case, the frictional heat accumulated in the rotary tool is dissipated within the wait time, so works from the 11th one have substantially a constant temperature, and a variation width in process depth is 0.15 mm. No correlation is observed between the process depth and the tool temperature or cumulative processed number.

In contrast to this, in the second process example, the wait time for the rotary tool is only about two minutes. Before the frictional heat accumulated in the rotary tool is dissipated, the next process is started. Until the cumulative processed number reaches 21, as time passes, the surface temperature of the tool and the process depth tend to increase. As time passes, the process depth increases because the forcing amount of the tool increases by thermal expansion. A void occurs only in the 21st and 31st works because the forcing amount of the tool increases by thermal expansion in these works.

In the second process example, if the conditions are the same as in the first process example, good results cannot be obtained. However, if the moving trajectory of the rotary tool is long (the process time is long), the required process depth is large, and the work thickness in the surface modification region is large, the second process example can provide an effective process sequence. The rotary tool may be forcibly cooled by, e.g., blowing air.

[Other Process Example]

According to a process example other than surface treatment using the tool changer, the surface temperature of the rotary tool may be measured by using, e.g., a temperature sensor immediately before the start of surface treatment in accordance with frictional stirring, or the thermal expansion amount of the rotary tool may be measured by using, e.g., a touch sensor. The forcing amount of the rotary tool may be corrected in accordance with these measurement values. Alternatively, a plurality of NC control programs may be prepared in advance. Surface treatment may be performed by selecting appropriate NC control programs corresponding to the measurement values in units of works.

According to this method, even when the rotary tool is thermally expanded by frictional heat, the tool forcing amount can be controlled to be substantially constant. Thus, variations in depth of the surface modification range or occurrence of an internal void can be suppressed.

According to a practical process example, the process time per work is about 7 minutes, breaking down into (i) 1 minute and 20 seconds for work exchange, (ii) 1 minute and 10 seconds for measurement of surface temperature of the rotary tool, (iii) 30 seconds for measurement of thermal expansion amount of the rotary tool, and (iv) 4 minutes for surface treatment. The process is performed in accordance with the procedure of (i)→(iv).

Figure 19:
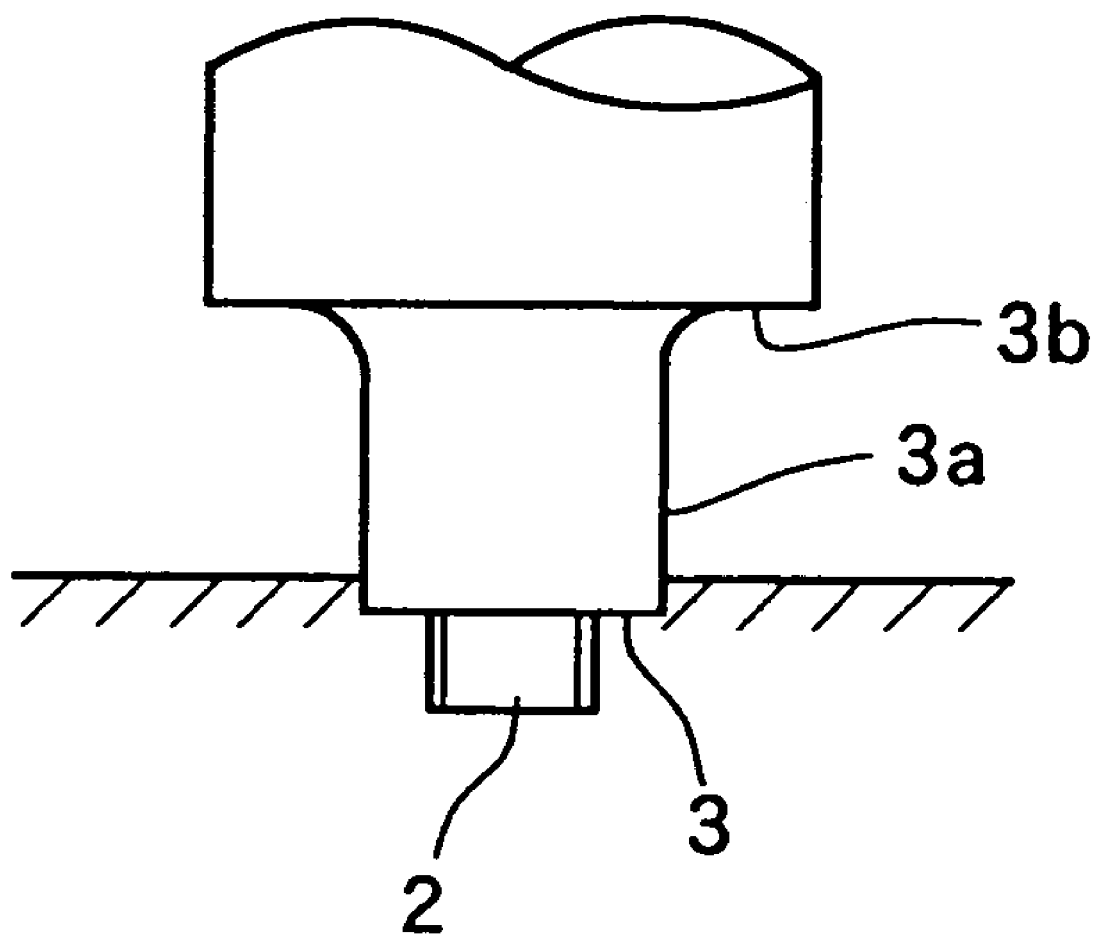
FIG. 19 is a view showing the temperature measurement portion and position measurement portion of the rotary tool.

Measurement of surface temperature of the above item (ii) is performed for an axial center $3a$ in the outer side surface of the shoulder 3 of the rotary tool 4 shown in FIG. 19 as the measurement portion, by using a contact thermometer or the like. Measurement of thermal expansion amount of the rotary tool 4 of the above item (iii) is performed with the displacement amount of a step $3b$ formed on the outer side surface of the shoulder 3 of the rotary tool 4 shown in FIG. 19 as the measurement portion, by using a dial gauge or the like. The step $3b$ is formed by cutting that portion of the rotary tool 4 which is close as possible to the distal end and which is not to be inserted in the work. Measurement is not performed for the distal end of the projection 2 or the end face of the shoulder 3 of the rotary tool 4 because the material stirred by surface treatment attaches to these portions. Then, the thickness of the material is undesirably included in the value measured as a thermal expansion amount.

FIG. 20 shows the surface temperature of the tool and tool position measurement data according to thermal expansion, which are obtained when ten works are continuously processed by one rotary tool in accordance with the above procedure. As the number of cumulative processed number increases, the surface temperature of the rotary tool increases, and the tool thermally expands by the temperature increase and elongates in the axial direction. Therefore, if the same NC control program is used, the forcing amount of the tool changes by the thermal expansion of the rotary tool. Consequently, the process depth varies, and an internal void occurs.

Based on the above result, (1) the rotary tool is attached to the main spindle of the machine tool. The vertical position of the portion for thermal expansion amount measurement is measured immediately before the start of surface treatment in accordance with frictional stirring by using a touch sensor or the like. The forcing amount of the tool is corrected or an appropriate NC control program is selected or changed in accordance with the measurement value. Thus, the forcing amount of the tool is controlled to a constant value.

(2) A relationship expressed by the following functional equation is observed between the surface temperature and thermal expansion amount of the tool shown in FIG. 20. The surface temperature of the tool is measured as the alternative characteristics of the thermal expansion amount of the tool before the start of surface treatment. The forcing amount of the tool is corrected or an appropriate NC control program is selected or changed in accordance with the measurement value, thereby controlling the forcing amount of the tool to a constant value.

$$(\Delta T - T) \times \alpha \times L = \Delta$$

where T is the initial surface temperature of the rotary tool, $\Delta T$ is the surface temperature of the rotary tool after temperature increase, L is the initial length of the rotary tool, $\Delta L$ is the length of the rotary tool after the temperature increases by $\Delta T$ (after thermal expansion), and $\alpha$ is the coefficient of linear expansion of the rotary tool.

A relationship with a correlation coefficient $R \approx 0.975$ is observed between the surface temperature and the thermal expansion amount of the tool shown in FIG. 20. Thus, the surface temperature of the tool may be measured as alternative characteristics of the thermal expansion amount of the tool before the start of surface treatment. The forcing amount of the tool may be corrected or an appropriate NC control program may be selected or changed in accordance with the measurement value and the correlation coefficient, thereby controlling the forcing amount of the tool to a constant value.

When either one or both of the above items (1) and (2) are employed, even if the tool or the main spindle of the machine tool thermally expands due to the temperature increase of the rotary tool, the process depth can be stabilized.

[Defect Inspection Method for Surface Treatment Member]

A defect occurring in the surface modification region is generally detected by the human through visual observation. When the size of the defect decreases, detection by means of visual observation becomes difficult. In the case of surface treatment in accordance with frictional stirring as in this embodiment, as a flash is formed on the work surface, it is further difficult to detect a defect of a portion covered with the flash by visual observation.

In view of this, according to this embodiment, during surface treatment in accordance with frictional stirring, the waveform of power of the main spindle of the machine tool is monitored by using a power meter or frequency meter. The electric energy consumed since the rotary tool comes into the work surface until it is extracted from the work surface is calculated by an arithmetic device such as a personal computer. Alternatively, the work surface temperature before the start of surface treatment is measured in advance by a temperature sensor or the like.

Immediately after the process, the relationship between the work temperature and the electric energy consumption is analyzed by using a personal computer or the like. When the electric energy consumption is abnormally high, it is determined that a defect has occurred, and an alarm is produced.

More specifically, an aluminum alloy cast material with a predetermined size (e.g., 150 mm in length×35 mm in width×20 mm in thickness) is used as a work. The rotary tool is attached to the main spindle of the NC machine tool. Surface treatment by means of frictional stirring is performed in accordance with the process conditions shown in FIG. 21, so the rotary tool forms a moving trajectory of 100 mm on the work surface.

When the process is continuously performed under the above conditions, the generated frictional heat is conducted to a jig that holds the work, and the heat of the jig is undesirably conducted to the next work. Hence, the surface temperature of the work immediately before the start of surface treatment is measured by a contact thermometer or the like.

Figure 22:
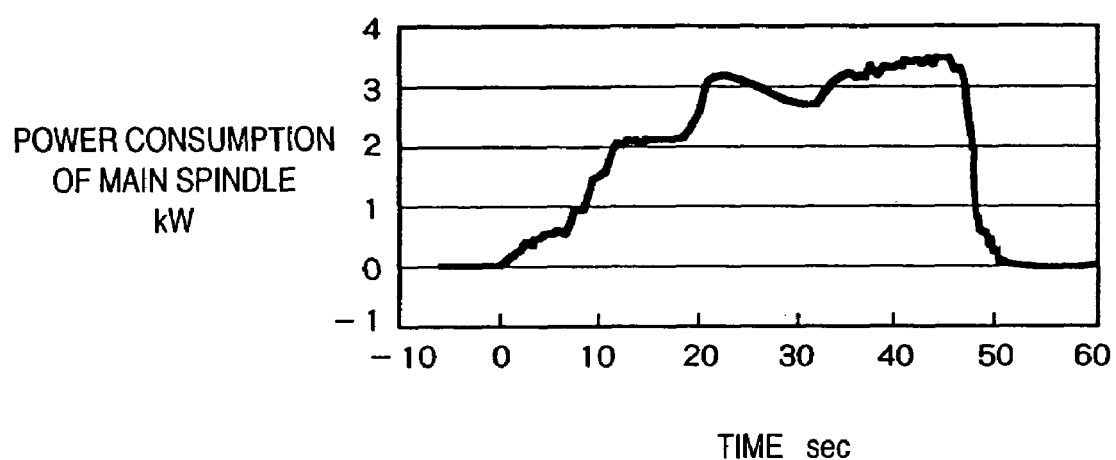
FIG. 22 is a graph showing the waveform of the power of the main spindle when surface treatment is performed by frictional stirring.

A power meter is attached to a power supply line to the main spindle motor. The measurement value of the power meter is transferred to a personal computer, so the waveform of the power of the main spindle shown in FIG. 22 is obtained. Furthermore, the electric energy consumption when the main spindle idles (in the non-load mode) is calculated in advance. The waveform of the power of the main spindle is integrated by using the calculated electric energy consumption as a reference value, thereby calculating the electric energy consumption of the main spindle required for surface treatment.

FIG. 23 shows the relationship between the measurement values of the work surface temperatures before the start of surface treatment in units of works and the electric energy consumption of the main spindle. When the surface modification region was inspected for a defect separately by visual observation, a defect was observed in a work corresponding to a position of 62.2° C.–113.18 kWs.

Figure 24:
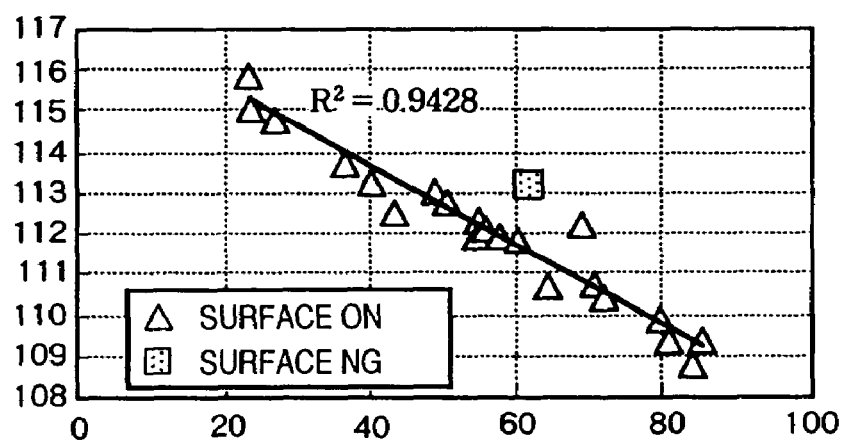
FIG. 24 is a graph showing the mutual relationship between the work temperature immediately before the frictional stirring process and the integral value of the waveform of power of the main spindle.

Whether a relationship was present between the inspection result obtained by the visual observation and the result shown in FIG. 24 was checked. A close relationship is observed with the measurement result of a work showing a rather high electric energy consumption for the work surface temperature, as shown in FIG. 24.

Therefore, by using the substantially linear relationship between the work temperature and the electric energy consumption of the main spindle shown in FIG. 24, when the measurement values of the work temperature and electric energy consumption exceed predetermined thresholds, it is determined that a defect has occurred in a work processed with the corresponding process, and an alarm is produced. The number of steps required by visual observation can thus be eliminated, and whether the work is defective or not can be checked on the assembly line by on-line remote control.

The present invention is not limited to the above embodiments and various changes and modifications can be made within the spirit and scope of the present invention. Therefore, to apprise the public of the scope of the present invention the following claims are made.

INDUSTRIAL APPLIABILITY

Surface treatment according to this embodiment is aimed at a cast material made of an aluminum alloy, and is particularly used for a surface modification process of a portion between adjacent ports (valve-to-valve portion) formed in, e.g., the cylinder head of an automobile, or a piston, a brake disk, or the like of an automobile. The surface modification region of the cast material made of the aluminum alloy is stirred without melting by the frictional heat, thereby the metal structure becomes finer, the grains of eutectic silicon (Si) are dispersed uniformly, and cast defects are decreased. A modified surface which is better in the material characteristics, e.g., a thermal fatigue (low-cycle fatigue) life, elongation, and shock resistance, than that obtained with a conventional remelt process can be obtained.

A memory medium storing control data or control program of the machine tool for performing the surface treatment method of this embodiment, a computer program for performing an inspection method for a surface treatment member, or the program codes of the computer program may be supplied to the computer. This computer may read out the program codes stored in its memory medium and perform the process of the above embodiment.

What is claimed is:

1. A surface treatment method for a work having a plurality of openings, inserting a rotary tool between the openings in a work surface, and stirring and modifying the work surface without frictional heat generated by the rotary tool melting the work surface, comprising:
   forming margins to interfere with deformation of the openings due to softening of a material in which the openings are formed;
   stirring the work surface between the adjacent openings using the rotary tool, the rotary tool being detachably supported by a machine tool;
   changing the rotary tool to a deflashing tool for removing a flash of the work after a surface treatment region of the work is stirred by the rotary tool and when a post-machining for removing the margins is performed;
   processing a surface treatment region with the deflashing tool; and
   selecting a rotary tool different from a rotary tool which is used immediately before and performing a surface treatment of an untreated work with the selected tool after the process with the deflashing tool.

2. A surface treatment method for a work having a plurality of openings, inserting a rotary tool between the openings in a work surface, and stirring and modifying the work surface without frictional heat generated by the rotary tool melting the work surface, comprising:
   forming margins to interfere with deformation of the openings due to softening of a material in which the adjacent openings are formed;
   stirring the work surface between the openings using the rotary tool;
   performing post-machining for removing the margins;
   measuring a pre-treatment temperature of a surface treatment region of the work when a post-machining for removing the margins is performed;
   measuring a load of the rotary tool to the surface treatment region during a process; and
   checking whether a surface treatment member is defective or not from a preset correlation map of the pre-treatment temperature and the load of the rotary tool, and the measured pre-treatment temperature and load.

3. The surface treatment method according to claim 2, wherein the correlation map is defined by the pre-treatment temperature of the work and an electric energy to be supplied to driving means of the rotary tool, and a rotational speed of the rotary tool can be changed by the electric energy.

4. A surface treatment method for a work having a plurality of openings and portions with different rigidities between the openings, inserting a rotary tool between the openings in a work surface, and stirring and modifying the work surface without frictional heat generated by rotation and reciprocal motion of the rotary tool melting the work surface, comprising:

separately setting a high-rigidity portion and a low-rigidity portion which are adjacent in a surface treatment region of the work between the openings;

moving the rotary tool along the low-rigidity portion in a forward path with respect to the work; and subsequent to the forward path, moving the rotary tool along the high-rigidity portion with respect to the work in a return path.

5. The surface treatment method according to claim 4, wherein the surface treatment region has different thicknesses in the high-rigidity and low-rigidity portions.

* * * * *

UNITED STATES PATENT AND TRADEMARK OFFICE
CERTIFICATE OF CORRECTION

PATENT NO.        : 6,991,149 B2
APPLICATION NO. : 10/468463
DATED             : January 31, 2006
INVENTOR(S)       : Hiroaki Kusunoki et al.

It is certified that error appears in the above-identified patent and that said Letters Patent is hereby corrected as shown below:

On Title Page Item (54), Column 1 (Title), Lines 1-6, delete "SURFACE TREATMENT METHOD, SURFACE TREATMENT APPARATUS, MEMBER SUBJECTED TO SURFACE TREATMENT, AND INTERMEDIATE MEMBER TO BE SUBJECTED TO SURFACE TREATMENT" and insert - - FRICTIONAL STIRRING SURFACE TREATMENT METHOD AND APPARATUS - - therefor.
Sheet 23 of 24 (FIG. 23), Line 1, delete "KWs" and insert - - kWs - - therefor.
Sheet 24 of 24 (FIG. 24, Line 4, delete "KWs" and insert - - kWs - - therefor.
Column 1 (Title), Lines 1-6, delete "SURFACE TREATMENT METHOD, SURFACE TREATMENT APPARATUS, MEMBER SUBJECTED OT SURFACE TREATMENT, AND INTERMEDIATE MEMBER TO BE SUBJECTED TO SURFACE TREATMENT" and insert - - FRICTIONAL STIRRING SURFACE TREATMENT METHOD AND APPARATUS - - therefor.
Column 1, Line 22, delete "distal-end" and insert - - distal end - - therefor.
Column 2, Line 19, delete "process-and" and insert - - process and - - therefor.
Column 2, Line 61, delete "high-" and insert - - high-rigidity - - therefor.
Column 3, Line 56, delete "wide-region" and insert - - wide region - - therefor.
Column 5, Line 2, delete "as-a" and insert - - as a - - therefor.
Column 8, Line 39, delete "can-be" and insert - - can be - - therefor.
Column 10, Line 18, after "material" delete ",.e.g.," and insert - - , e.g. -- therefor.
Column 11, Line 23, delete "surface-treatment" and insert - - surface treatment - - therefor.
Column 14, Line 24, after "=Δ" insert - - L - -.
Column 14, Line 32, delete "R≈0.975" and insert - - R=0.975 - - therefor.
Column 15, Line 61, delete "APPLIABILITY" and insert - - APPLICABILITY - - therefor.

Signed and Sealed this

Twenty-second Day of August, 2006

JON W. DUDAS
*Director of the United States Patent and Trademark Office*